United States Patent [19]

Chang et al.

[11] 4,439,945
[45] Apr. 3, 1984

[54] INSTANT PUSH-BUTTON FASTENER FOR FISHING REEL SEAT

[76] Inventors: Paul P. H. Chang; Cheng-hsiang Chu, both of Room 3, 7 Fl., No. 603, Tung-Hwa S. Rd., Taipei, Taiwan

[21] Appl. No.: 296,011

[22] Filed: Aug. 25, 1981

[51] Int. Cl.³ .............................................. A01K 87/06
[52] U.S. Cl. ....................................................... 43/22
[58] Field of Search ................. 43/22; 24/208 A, 214, 24/213 R; 403/406, 408; 411/508

[56] References Cited

U.S. PATENT DOCUMENTS 2,041,335  5/1936  Hall ................................... 403/408 X
2,777,240  1/1957  Hutchison .............................. 43/22

Primary Examiner—Nicholas P. Godici
Assistant Examiner—Jerold L. Johnson
Attorney, Agent, or Firm—Cushman, Darby & Cushman

[57] ABSTRACT

An instant push-button fastener for fastening a fishing reel seat to the handle of a fishing rod comprises a clamping button, a coupling sleeve and a releasing button. The clamping button is depressed to insert an engaging head into the coupling sleeve. The coupling sleeve fixedly retains the engaging head, securing the fishing reel seat to the handle of the fishing rod. The releasing button is depressed to release the engaging head from the coupling sleeve, thus releasing the fishing reel seat from the handle.

9 Claims, 7 Drawing Figures

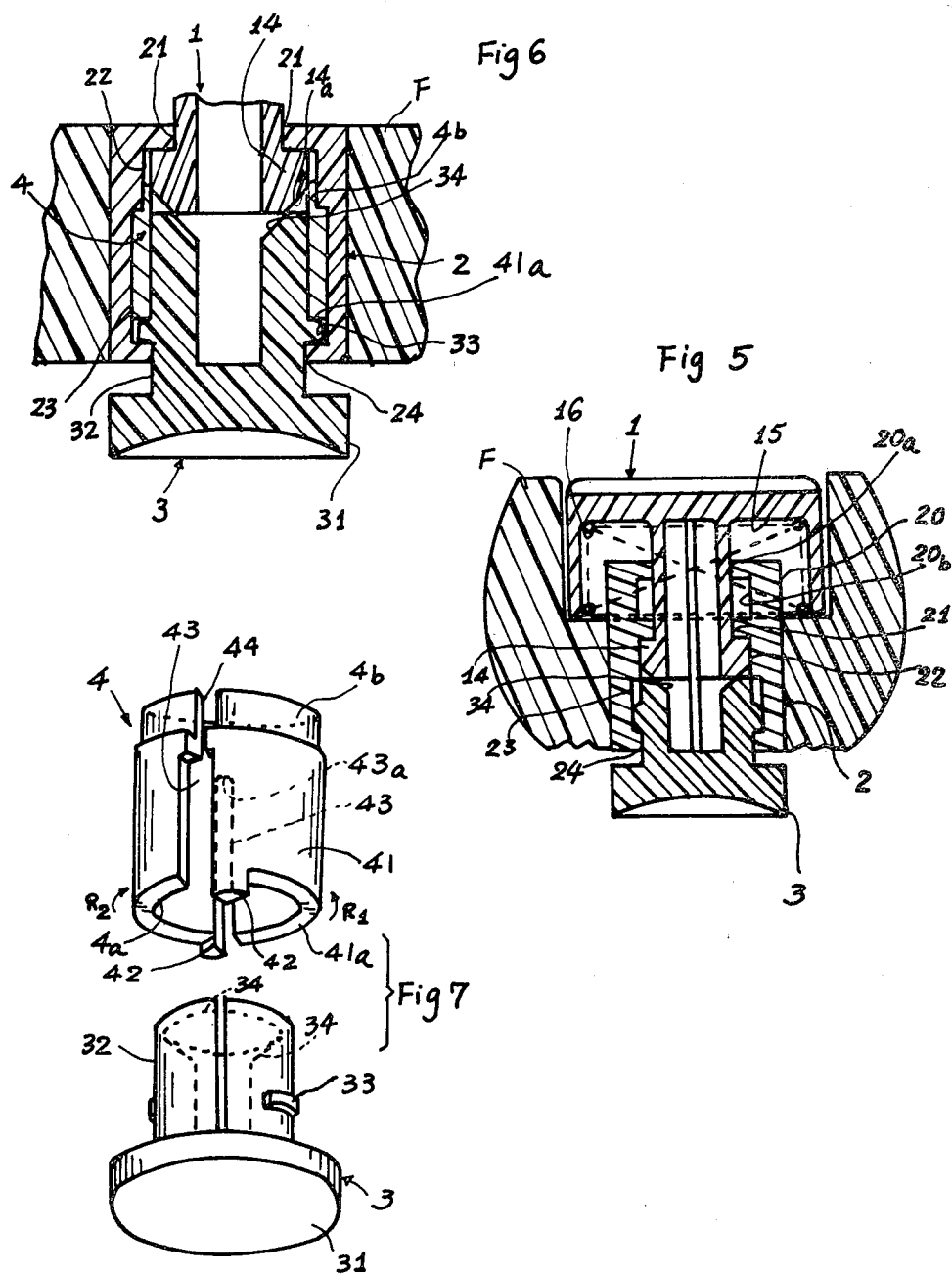

INSTANT PUSH-BUTTON FASTENER FOR FISHING REEL SEAT

BACKGROUND OF THE INVENTION

The conventional fastener for securing a reel seat on a fishing rod may be shown in FIG. 1 in that such a fastener C comprises a button $C_1$ having a stud $C_2$ which is threaded to engage with an upper clamping plate $C_3$. The button $C_1$ can be rotated either clockwise or counter-clockwise to secure or release the bracket B of a fishing reel seat R. It is inconvenient for securing or dismantling such a reel on a fishing rod. In order to fix the clamping plate $C_3$ on the stud of button $C_1$, a screw $C_4$ should be provided for its fixation which, however, needs a label of trademark or other ornamental figure to cover on the screw recess $C_5$ for better appearance of the fastener which may increase the production cost thereof.

SUMMARY OF THE INVENTION

One object of the present invention is to provide a fastener comprising a clamping button, a coupling sleeve and a releasing button for quicker securing or releasing a reel seat on a fishing rod.

Another object of the present invention is to provide a fastener in that the coupling sleeve is enlarged to form an upper first receiving hole and first cylindrical button hole above the second receiving hole and second cyindrical button hole to insert the clamping button, through first two holes, then into second two holes so that, when released by depressing the lower releasing button, the clamping button may be retracted into the first two holes to prevent their leaving from the present fastener.

Further object of the present invention is to provide a fastener wherein a safety lock is fixed within coupling sleeve to prevent from false depression of the releasing button and prevent from false releasing of the clamping button and fishing reel seat.

BRIEF DESCRIPTION OF THE DRAWINGS

FIG. 5 is a sectional drawing of another preferred embodiment in accordance with the present invention.

FIG. 6 is a sectional drawing of further preferred embodiment of the present invention.

FIG. 7 is a perspective drawing of the safety lock and releasing button in accordance with the present invention.

DESCRIPTION OF THE PREFERRED EMBODIMENTS

Figure 1:
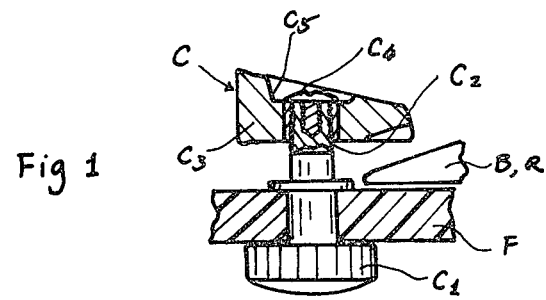
FIG. 1 is a partial sectional drawing of conventional fastener.
Figure 2:
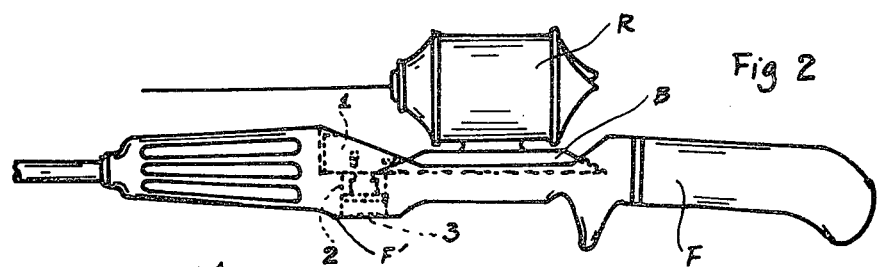
FIG. 2 is an illustration to apply the present invention on a fishing rod.
Figure 3:
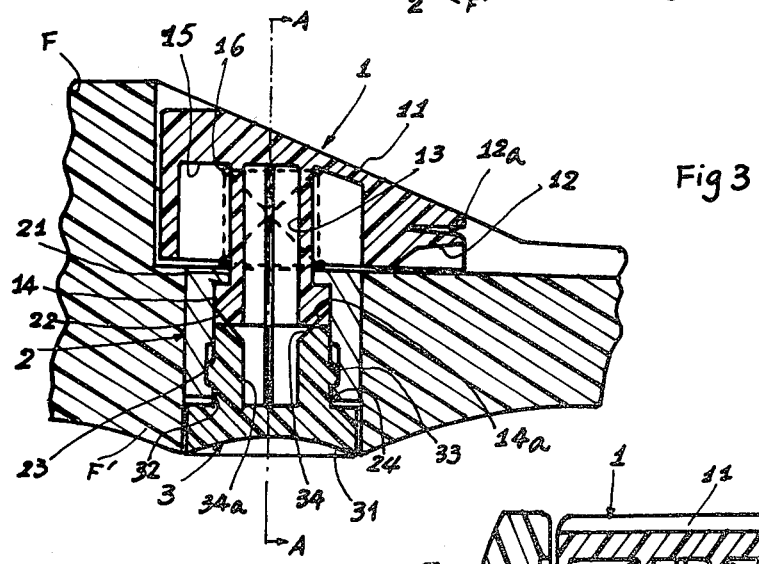
FIG. 3 is a sectional drawing of the present invention.
Figure 4:
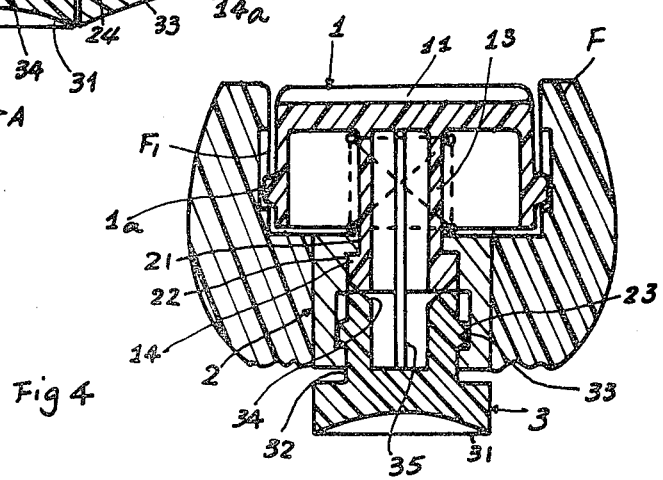
FIG. 4 is a sectional drawing of the present invention taken from AA direction of FIG. 3.

As shown in FIGS. 2, 3 and 4, the present invention comprises a clamping button 1, a coupling sleeve 2 and a releasing button 3.

Said clamping button 1 comprises a button 11 with an uppermost inclined surface. A clamping hood 12 is formed on one side of said button 11. A cutting slit 12a is formed above said clamping hood 12 for resiliently clamping the base B of a fishing reel R on the handle F of a fishing rod. Said button 11 extends downwards an engaging trunk 13 connected with lower engaging head 14 which is a cylindrical head, having enlarged diameter than that of said trunk 13 and tapered by a truncated cone portion 14a. Said trunk 13 and engaging head 14 are cut seveal slits (not shown) thereon. A concave portion 15 is formed under said button 11. A compression spring 16 is jacketed around said trunk 13. As shown in FIG. 4, two lugs 1a are provided on both sides of said button 1 to be movably restricted within the grooves F1 on the handle F.

Said coupling sleeve 2 is a hollow cylinder fixed into handle F1. An upper receiving hole 21 is formed in the upper portion of said sleeve 2. Said receiving hole 21 has a diameter as same as that of said trunk 13 and expands its diameter to form a cylindrical button hole 22 to engage with said engaging head 14. A cylindrical lug hole 23 is formed under said button hole 22 to restrict two lugs 33 of said releasing button 3. A lower receiving hole 24 is formed on the lowest end of said sleeve 2 to insert said releasing button 3.

Said releasing button 3 comprises a button 31 which extends a trunk 32 having two lugs 33 disposed on both opposite sides thereof. An inversed cone socket 34 is formed on the top center of said trunk 32 to coincide with said truncated cone portion 14a. Said socket 34 is recessed with a cylindrical bore 34a. Said trunk 32 is also cut with several slits 35.

Said coupling sleeve 2 may be made from copper or stainless steel. Said clamping button 1 and releasing button 3 may be made of resilient plastics such as polyacetal or other suitable materials.

In order to prevent from false depression of said releasing button 3, the handle may be shaped as arch portion F' as shown in FIGS. 2 and 3.

When using the present invention, the clamping hood 12 of said clamping button 1 may be positioned above the base B of a fishing reel R and then the clamping button 1 is depressed to allow said engaging head 14 having truncated cone portion 14a shrinkingly inserted into said button hole 22 of said coupling sleeve 2 so as to firmly secure the reel seat on fishing handle. When dismantling the reel seat, said releasing button 3 may be depressed to raise said inversed cone socket 34 of said trunk 32 to shrink said engaging head 14 and the compression spring 16 will retract said button 1 to release the secured reel. The lugs 1a provided on button 1 will restrict said button 1 against its separation from handle F.

When putting trunk 32 of releasing button 3 into sleeve 2, the trunk 32 is cut with slits to allow its shrinkage to pass hole 24 and then expanded to fix in said sleeve. Lugs 33 will help said releasing button 3 move within said sleeve 2.

Said engaging head 14 is shrinkingly inserted into said sleeve 2 because several slits 13a are formed on said trunk 13 and head 14 of said button 1.

The present invention can be used to secure the reel seat on a fishing rod instantly, firmly and conveniently. No screw is expected to construct the present fastener.

Another preferred embodiment of the present invention is shown in FIG. 5 in that said coupling sleeve 2 extends into said concave portion 15 under said button 11 to form an upper extension 20 which is centrally formed a first receiving hole 20a and a first cylindrical button hole 20b. Said receiving hole 20a and button hole 20b are respectively equivalent to said receiving hole 21 and said cylindrical button hole 22 with the same size.

Such a preferred embodiment will omit the lugs 1a on said button 1 and grooves F1 on the handle shown in FIG. 4. Whenever installing the clamping button 1, said engaging head 14 may be first inserted through said holes 20a, 20b and then into holes 21 and 22 for the stabilization of said button 1.

In FIGS. 6 and 7, further preferred embodiment of the present invention is shown wherein a safety lock 4 is further provided within said coupling sleeve 2. Said safety lock 4 comprises a hollow cylinder 41 whose lower annular surface forms as an obstructing surface 41a. Two extension stops 42 extend from said obstructing surface 41a and are disposed oppositely along said cylinder 41. Said cylinder 41 is longitudinally cut between said two extension stops 42 to form two slits 43 in that one slit 43 is ended at point 43a and another slit 43 is fully open at point 44. An extension plug 4b is formed atop to insert said safety lock into holes 23 and 22. Said two slits 43 help said lock 4 shrinkingly inserted into said coupling sleeve.

After installing the present safety lock 4 into said coupling sleeve 2, said releasing button 3 is then inserted into the hollow cylindrical hole 4a and rotated in direction R1 to allow said lugs 33 being obstructed by said extension stops 42 for the fixation of said button 3. The clamping button 1 is then depressed to secure the reel seat on handle of fishing rod. If rotating said button 3 in direction R2 to allow said lugs 33 sliding through slits 43, said inversed cone socket 34 will retract said engaging hand 14 of said clamping button 1 so as to release the reel seat.

During inserting the releasing button 3, there is no need to concentrate in mind to distinguish which direction is R1 and which direction is R2. This is because that, whenever rotating said button 3 to a stop position and then depressing said button 3 inwards to find said lugs 33 being obstructed, it means that the button is stabilized in a locking position and the releasing button 3 will not be falsely depressed to dismantle the secured reel seat. If rotating said button to a stop position and then depressing said button 3 inwards without being obstructed, it means that said lugs 33 have passed through the slits 43 and the button 3 should be counter-rotated to a locking position.

We claim:

1. An instant push-button fastener for fastening a fishing reel seat to a handle of a fishing rod comprising:
   a coupling sleeve disposed in said handle of said fishing rod;
   a depressable clamping button comprising:
      an engaging head for insertion into and fixed retention by said coupling sleeve,
      a clamping hood for securing said fishing reel seat to said handle, and
      first biasing means associated with clamping hood for urging said fishing reel seat toward said handle; and
   a releasing button disposed in said coupling sleeve for releasing said engaging head from said coupling sleeve.

2. An instant push-button fastener as in claim 1 further comprising:
   a plurality of lugs extending from said clamping button; and
   wherein said handle of said fishing rod defines a plurality of grooves for retaining said lugs.

3. An instant push-button fastener as in claim 10 wherein said clamping button further comprises:
   a clamping trunk extending from said clamping button and terminating with said engaging head, said clamping trunk having a cross-sectional width smaller than the cross-sectional width of said engaging head, said clamping trunk and said engaging head forming a plurality of longitudinal slits for contracting the cross-sectional width of said engaging head in order to insert said engaging head into and extract said engaging head from said coupling sleeve; and
   second biasing means for urging said clamping button away from said coupling sleeve.

4. An instant push-button fastener as in claim 3 wherein said second biasing means comprises a compression spring encircling said clamping trunk.

5. An instant push-button fastener for fastening a fishing reel seat to a handle of a fishing rod comprising:
   a coupling sleeve disposed in said handle of said fishing rod;
   a clamping button for securing said fishing reel seat to said handle comprising a clamping trunk an engaging head terminating in a truncated cone for insertion into and fixed retention by said coupling sleeve; and
   a releasing button for releasing said engaging head from said coupling sleeve comprising:
      a releasing trunk disposed in said coupling sleeve, said releasing trunk defining a socket shaped as an inverted cone for mating with said engaging head, said releasing trunk having a plurality of longitudinal slits for contracting the cross-sectional width of said releasing trunk in order to insert said releasing trunk into said coupling sleeve.

6. An instant push-button fastener as in claim 5 wherein said coupling sleeve comprises:
   a hollow cylinder having a wall defining a first receiving hole for accepting said clamping trunk,
   said wall also defining a second receiving hole for accepting said releasing trunk, and
   said wall also defining a first annular slot inside said hollow cylinder for retaining said engaging head of said clamping button.

7. An instant push-button fastener as in claim 6 wherein:
   said wall also defines a second annular slot inside said hollow cylinder; said fastener
   further comprising a plurality of lugs extending from said releasing trunk movably disposed in said second annular slot for retaining said releasing button.

8. An instant push-button fastener as in claim 6 wherein:
   said wall also defines a hollow cylindrical extension portion extending from said first receiving hole toward said clamping trunk;
   said wall also defines a third receiving hole for accepting said clamping trunk; and
   said wall also defines a third annular slot inside said extension portion having dimensions substantially equal to said first annular slot for fixedly retaining said engaging head of said clamping button.

9. An instant push-button fastener for fastening a fishing reel seat to a handle of a fishing rod comprising:
   a coupling sleeve disposed in said handle of said fishing rod;
   a clamping button for securing said fishing reel seat to said handle of said fishing rod comprising an engaging head for insertion into and fixed retention by said coupling sleeve;

a releasing button rotatably disposed in said coupling sleeve for releasing said engaging head from said coupling sleeve, and including two lugs extending toward said coupling sleeve; and a safety lock comprising:

a hollow cylinder disposed within said coupling sleeve having a wall defining two studs substantially diametrically opposite from one another extending longitudinally from said cylinder toward said releasing button for abutting said lugs to limit the rotation of said releasing button, and a wall of said hollow cylinder defining a first longitudinally slit traversing along the entire length of said hollow cylinder and a second longitudinal slit traversing a distance length less than the entire length of said hollow cylinder for contracting the diameter of said hollow cylinder to allow insertion into said coupling sleeve and for sliding said lugs along the length of said hollow cylinder.

* * * * *